United States Patent
Iino et al.

(10) Patent No.: US 11,153,484 B2
(45) Date of Patent: Oct. 19, 2021

(54) IMAGE PROCESSING DEVICE AND IMAGE PROCESSING METHOD

(71) Applicants: DENSO TEN Limited, Kobe (JP); TOYOTA JIDOSHA KABUSHIKI KAISHA, Toyota (JP)

(72) Inventors: Masahiro Iino, Kobe (JP); Michihiro Takada, Kobe (JP); Mayuko Maeda, Kobe (JP); Toshihiro Takagi, Nisshin (JP); Yasutaka Matsunaga, Nisshin (JP)

(73) Assignees: DENSO TEN Limited, Kobe (JP); TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/848,491

(22) Filed: Apr. 14, 2020

(65) Prior Publication Data
US 2021/0006713 A1   Jan. 7, 2021

(30) Foreign Application Priority Data
Jul. 4, 2019   (JP) .............................. JP2019-125424

(51) Int. Cl.
*H04N 5/232*   (2006.01)
*B60R 1/00*   (2006.01)
(Continued)

(52) U.S. Cl.
CPC .......... *H04N 5/23238* (2013.01); *B60R 1/00* (2013.01); *B60R 11/04* (2013.01);
(Continued)

(58) Field of Classification Search
CPC .......... H04N 5/23238; H04N 5/23229; G06K 9/00805; B60R 1/00; B60R 11/04;
(Continued)

(56) References Cited

U.S. PATENT DOCUMENTS

| | | | |
|---|---|---|---|
| 2009/0121851 A1 | 5/2009 | Abe | |
| 2010/0134325 A1* | 6/2010 | Gomi | G03B 37/04 340/995.14 |

(Continued)

FOREIGN PATENT DOCUMENTS

| | | |
|---|---|---|
| CN | 105934368 B | 2/2018 |
| EP | 2955690 A1 | 12/2015 |

(Continued)

OTHER PUBLICATIONS

Sep. 28, 2020 Search Report issued in European Patent Application 20170099.4.

(Continued)

*Primary Examiner* — Richard A Hansell, Jr.
(74) *Attorney, Agent, or Firm* — Oliff PLC

(57) ABSTRACT

An image processing device used on a mobile body has: a determiner configured to determine one out of a plurality of combination patterns as to the presence or absence of an object in a plurality of predetermined regions around the mobile body; and a generator configured to generate a composite image by projecting onto a virtual projection surface a plurality of shot images acquired by a plurality of cameras taking images of the surroundings of the mobile body. The generator is configured to select, out of a plurality of projection surfaces prepared beforehand, the projection surface used in generating the composite image in accordance with the combination pattern determined by the determiner.

8 Claims, 10 Drawing Sheets

(51) Int. Cl.
B60R 11/04 (2006.01)
G06K 9/00 (2006.01)

(52) U.S. Cl.
CPC ..... G06K 9/00805 (2013.01); H04N 5/23229 (2013.01); *B60R 2300/105* (2013.01); *B60R 2300/20* (2013.01); *B60R 2300/303* (2013.01); *B60R 2300/806* (2013.01)

(58) Field of Classification Search
CPC ........ B60R 2300/105; B60R 2300/303; B60R 2300/20; B60R 2300/806
See application file for complete search history.

(56) References Cited

U.S. PATENT DOCUMENTS

| | | | | |
|---|---|---|---|---|
| 2012/0262580 | A1* | 10/2012 | Huebner | G06K 9/00791 348/148 |
| 2012/0287232 | A1* | 11/2012 | Natroshvili | G06T 7/33 348/36 |
| 2012/0320190 | A1* | 12/2012 | Natroshvili | G06T 7/85 348/135 |
| 2013/0194256 | A1* | 8/2013 | Gassmann | G08G 1/163 345/419 |
| 2014/0055487 | A1* | 2/2014 | Kiyo | G06T 11/60 345/629 |
| 2016/0350974 | A1* | 12/2016 | Hashimoto | G06T 19/006 |
| 2019/0005622 | A1 | 1/2019 | Niwa et al. | |
| 2019/0026557 | A1* | 1/2019 | Watanabe | G06T 1/00 |
| 2019/0349571 | A1* | 11/2019 | Herman | H04N 13/282 |
| 2020/0134777 | A1* | 4/2020 | Yamamoto | G06T 3/40 |
| 2020/0218910 | A1* | 7/2020 | Herman | G06T 7/215 |

FOREIGN PATENT DOCUMENTS

| | | | |
|---|---|---|---|
| JP | 2009118416 | A | 5/2009 |
| JP | 2010-128951 | A | 6/2010 |
| JP | 2014-41398 | A | 3/2014 |
| JP | 2014-183498 | A | 9/2014 |
| JP | 2014183498 | A * | 9/2014 |
| JP | 2017068826 | A | 4/2017 |
| JP | 2017-171128 | A | 9/2017 |
| JP | 2017175181 | A | 9/2017 |
| JP | 2018-34651 | A | 3/2018 |

OTHER PUBLICATIONS

Apr. 27, 2021 Office Action issued in Japanese Patent Application No. 2019-125424.

* cited by examiner

【Fig.1】
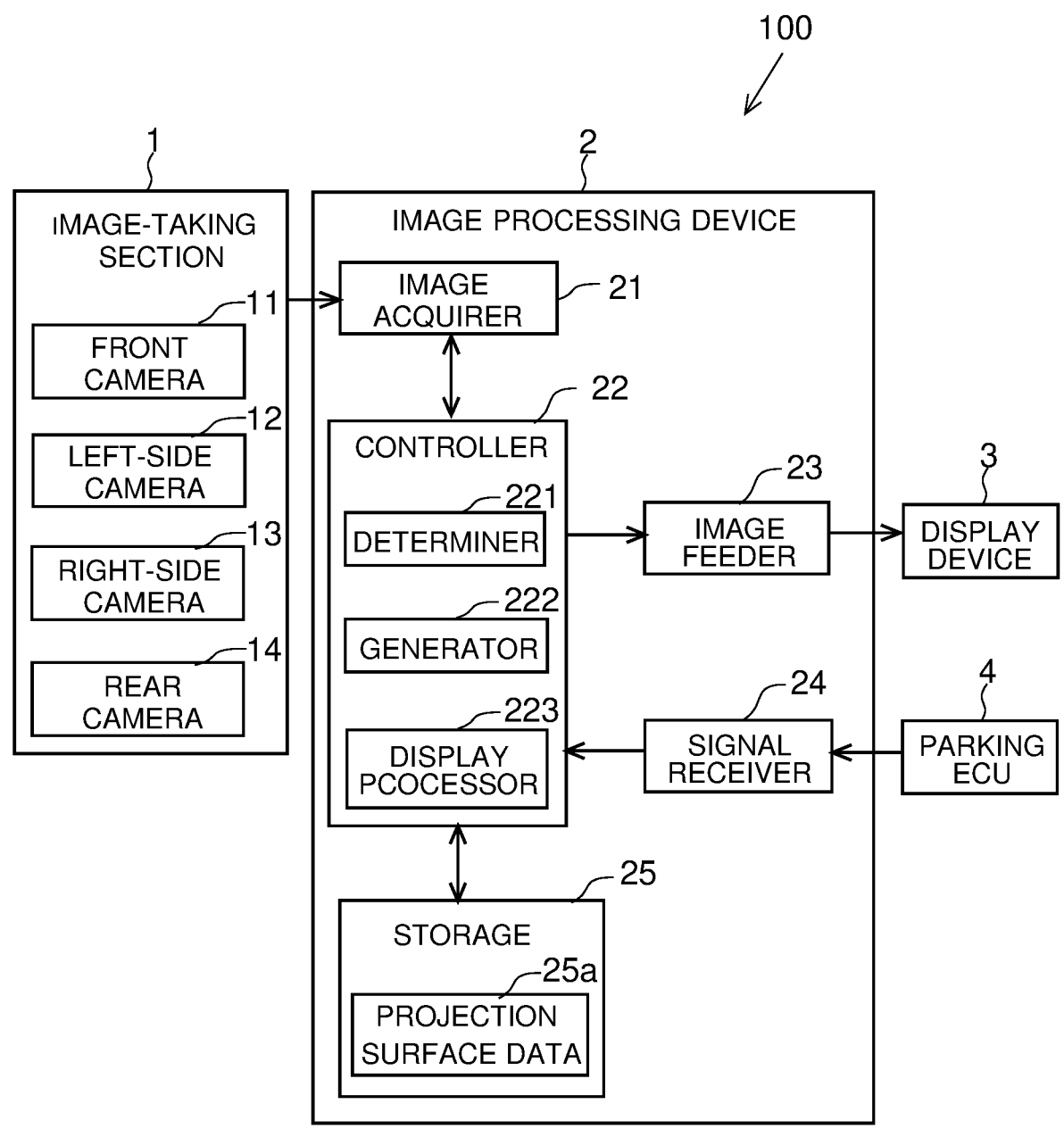

[FIg.2]
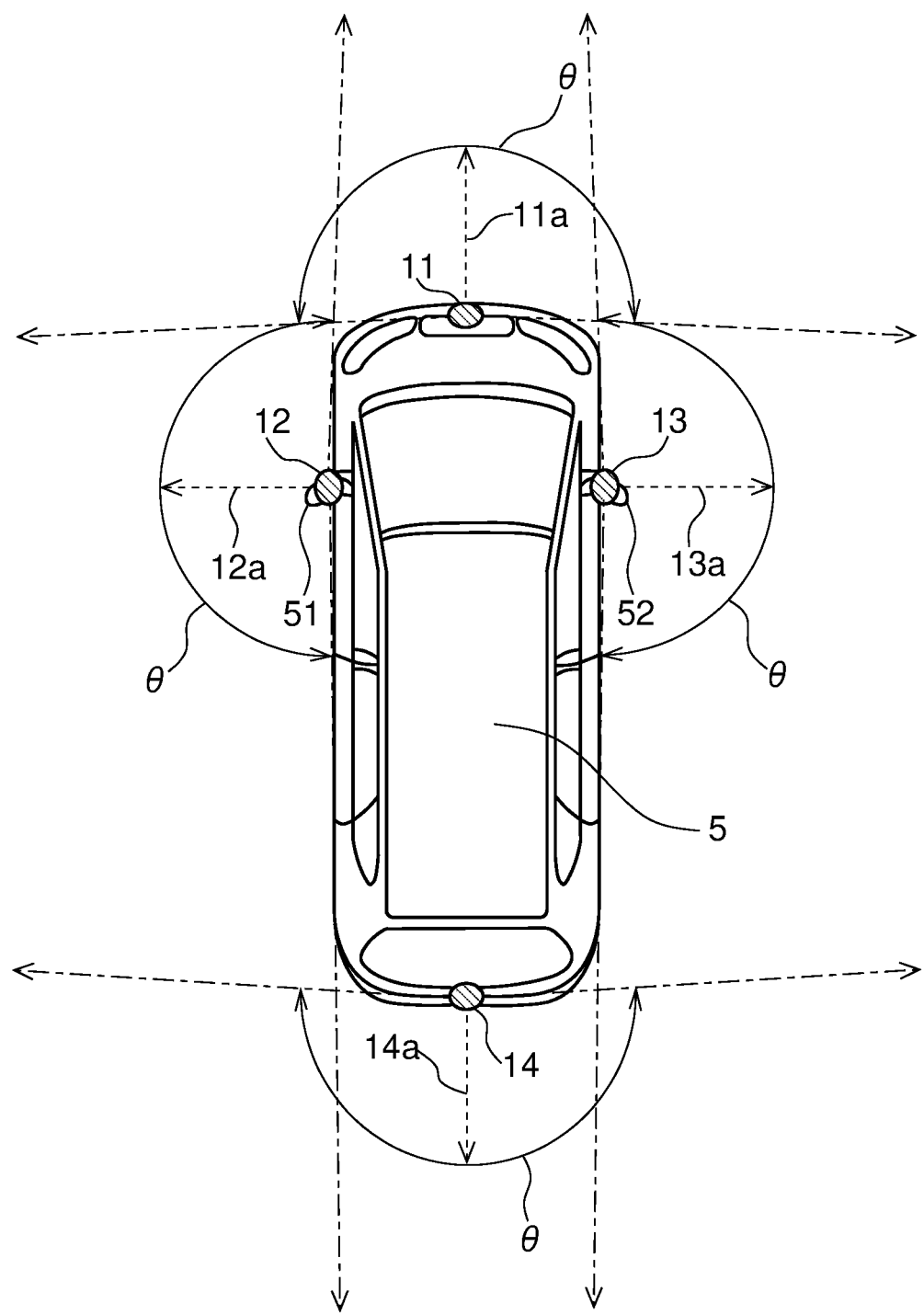

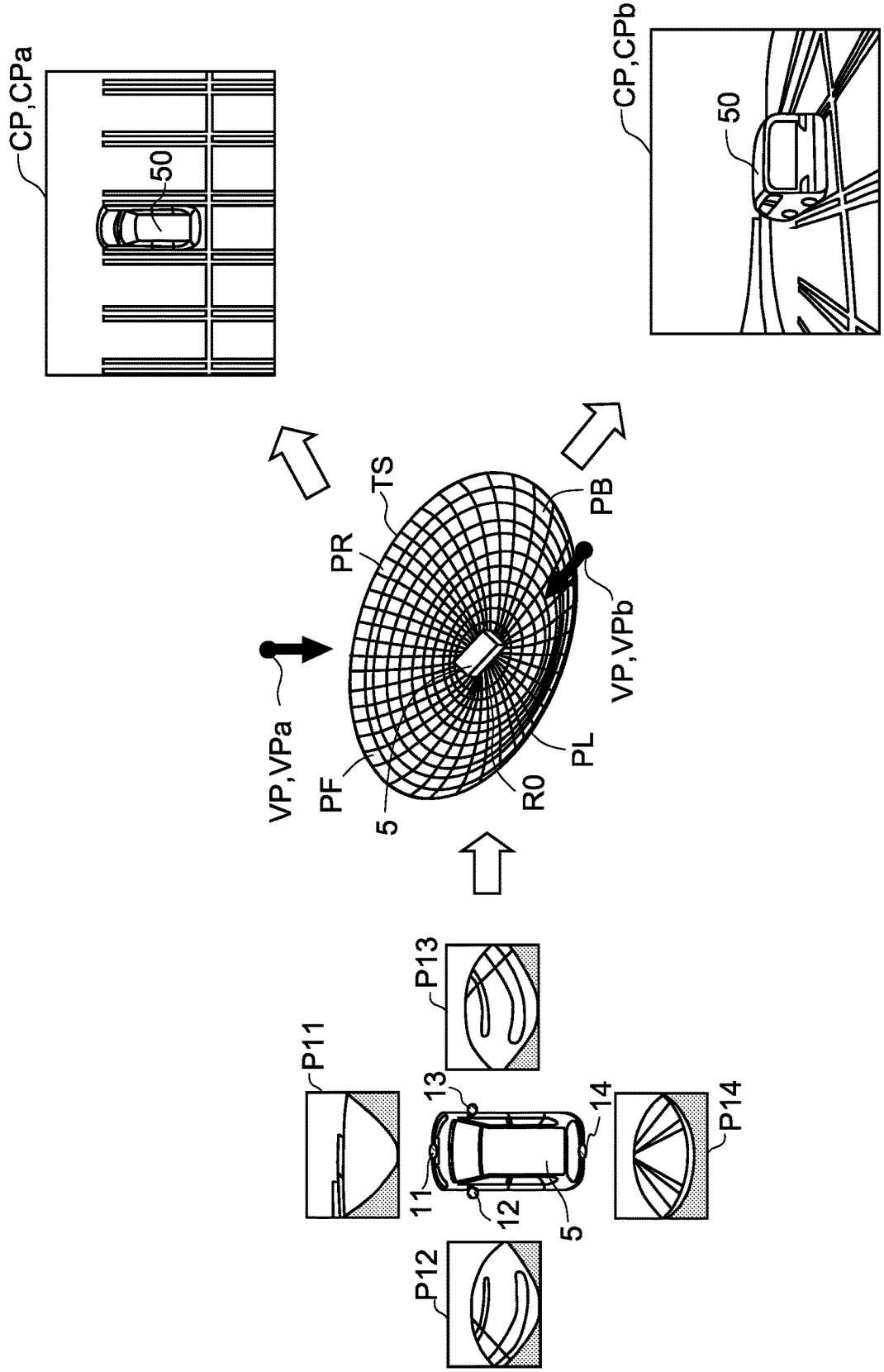

[Fig.4]
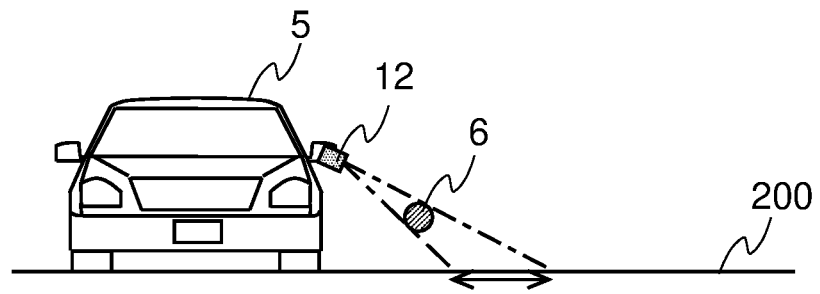
[Fig.5]
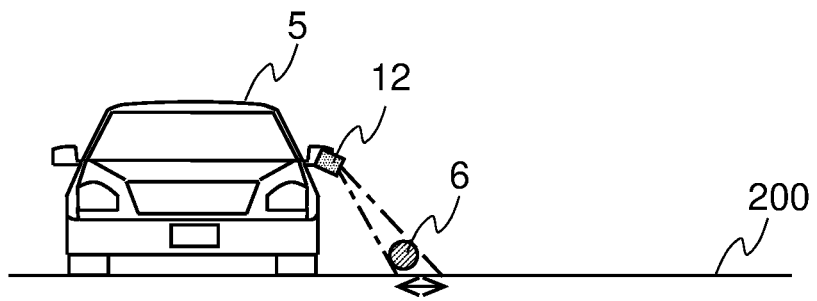
[Fig.6]
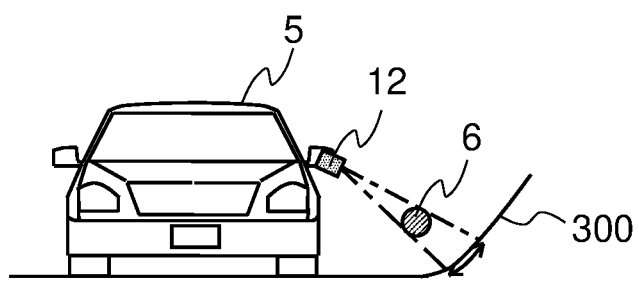

[Fig.7A]
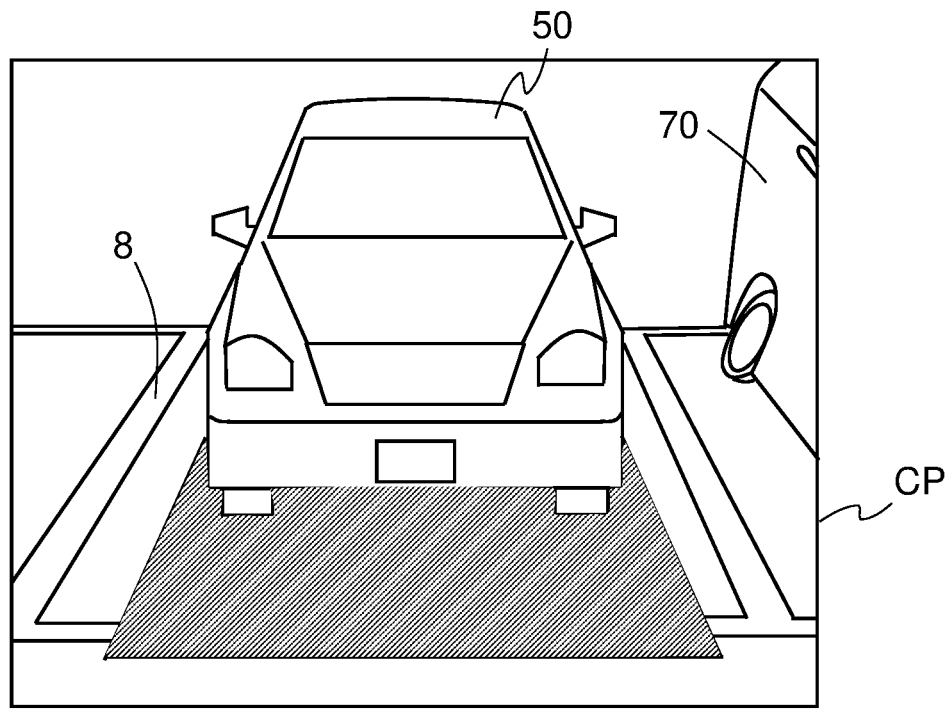
[Fig.7B]
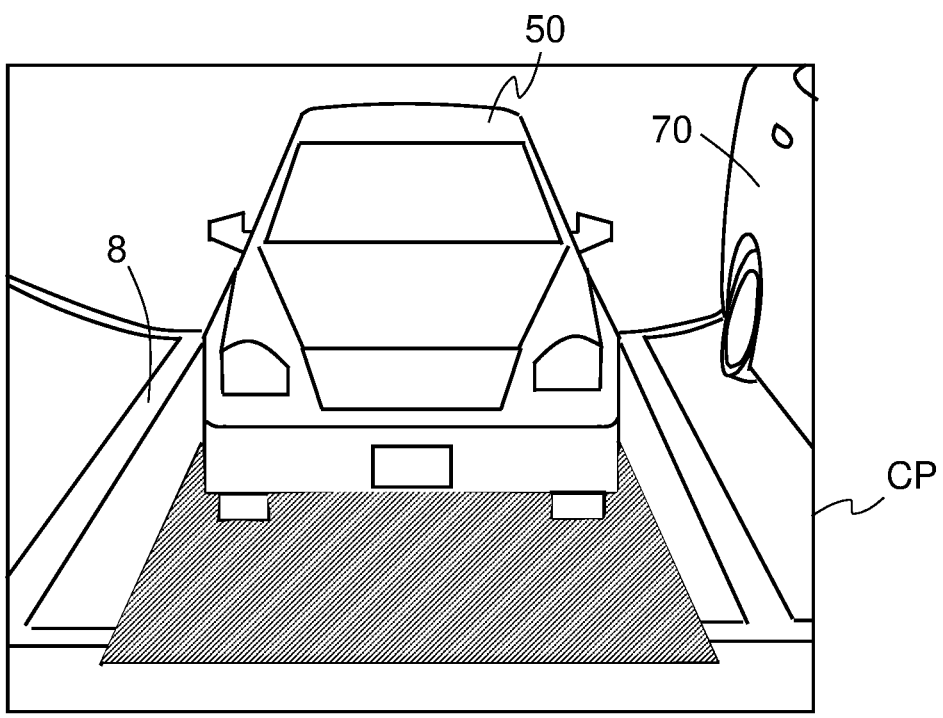

[Fig.8]
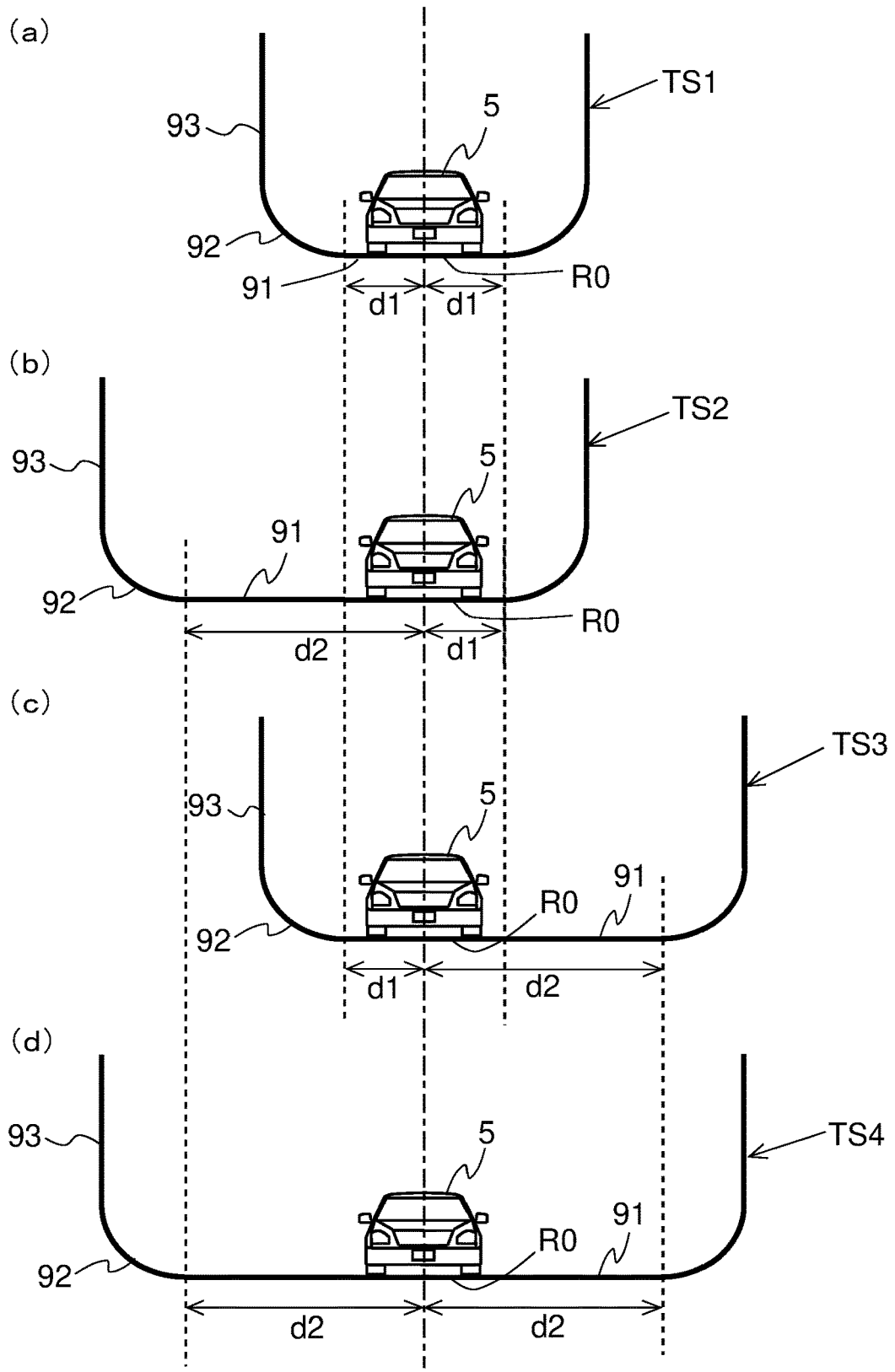

[Fig.9]
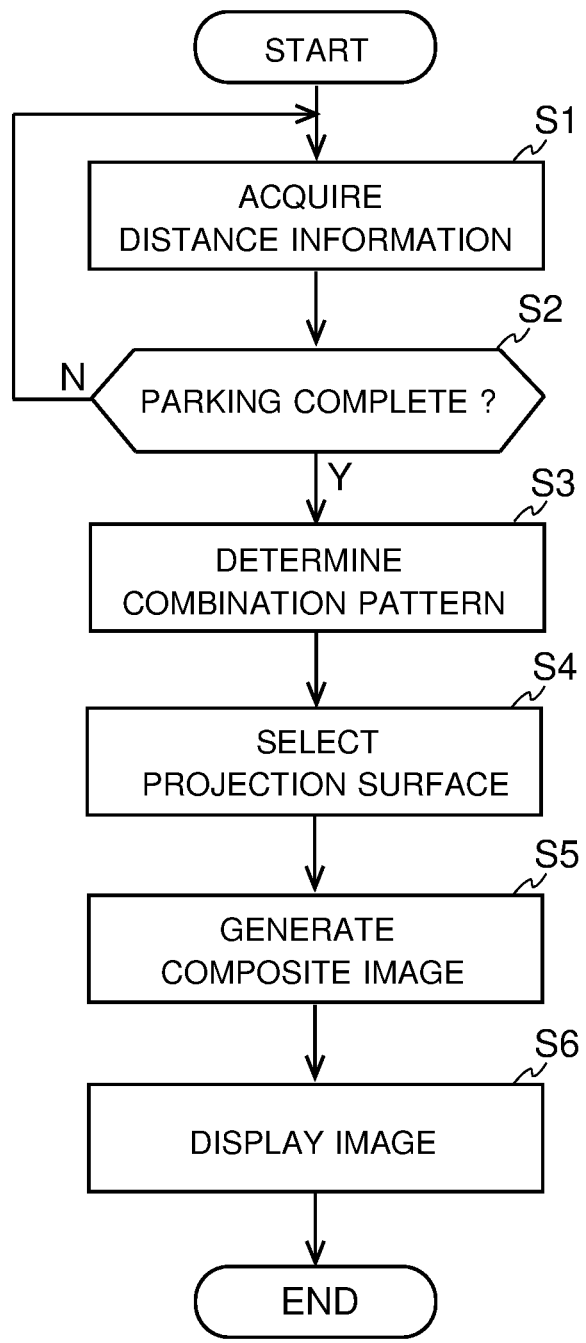

[Fig.10A]
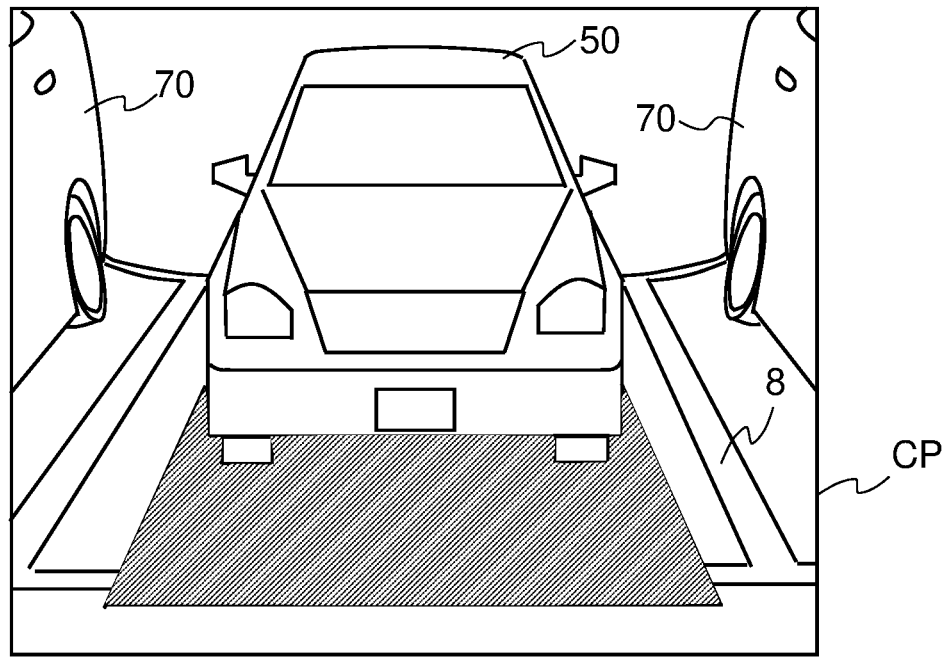
[Fig.10B]
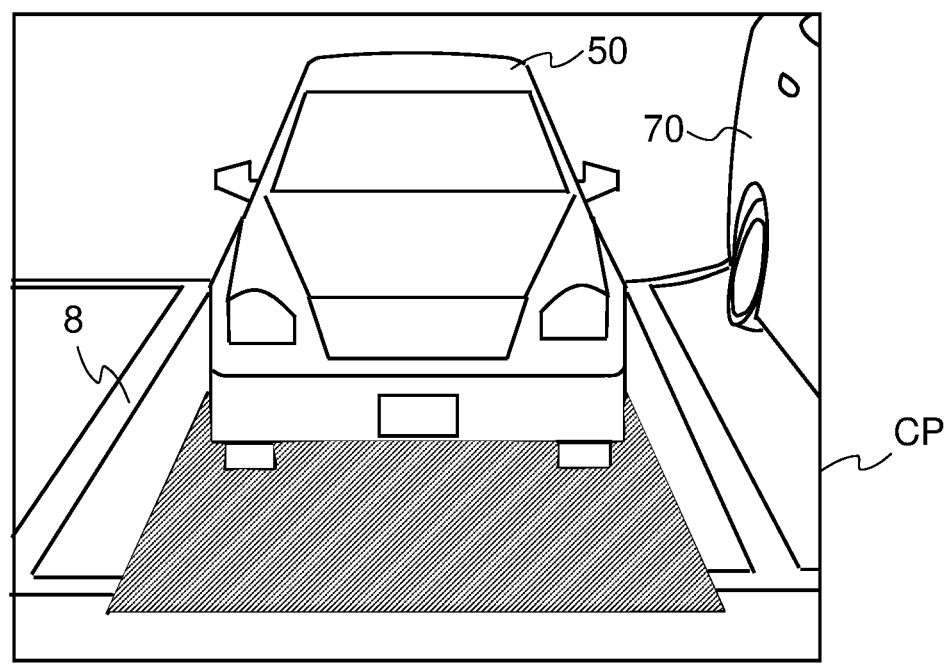

[Fig.10C]
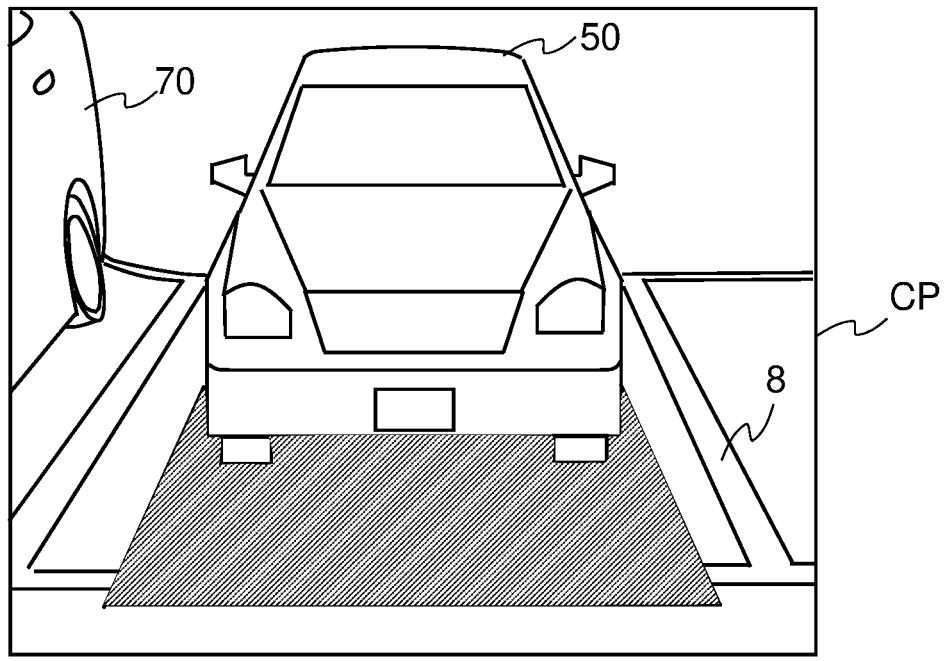
[Fig.10D]
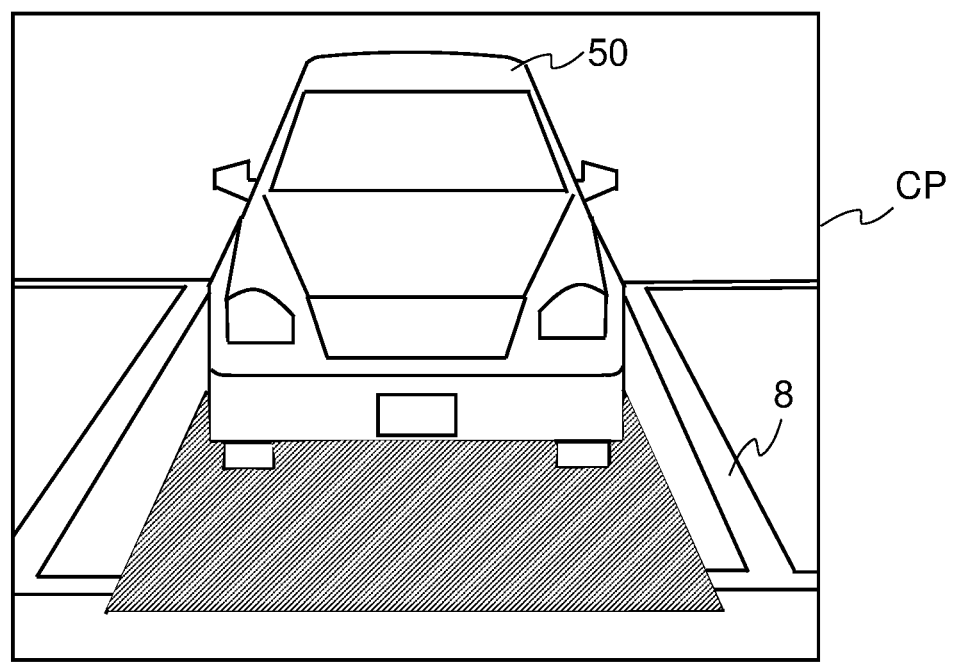

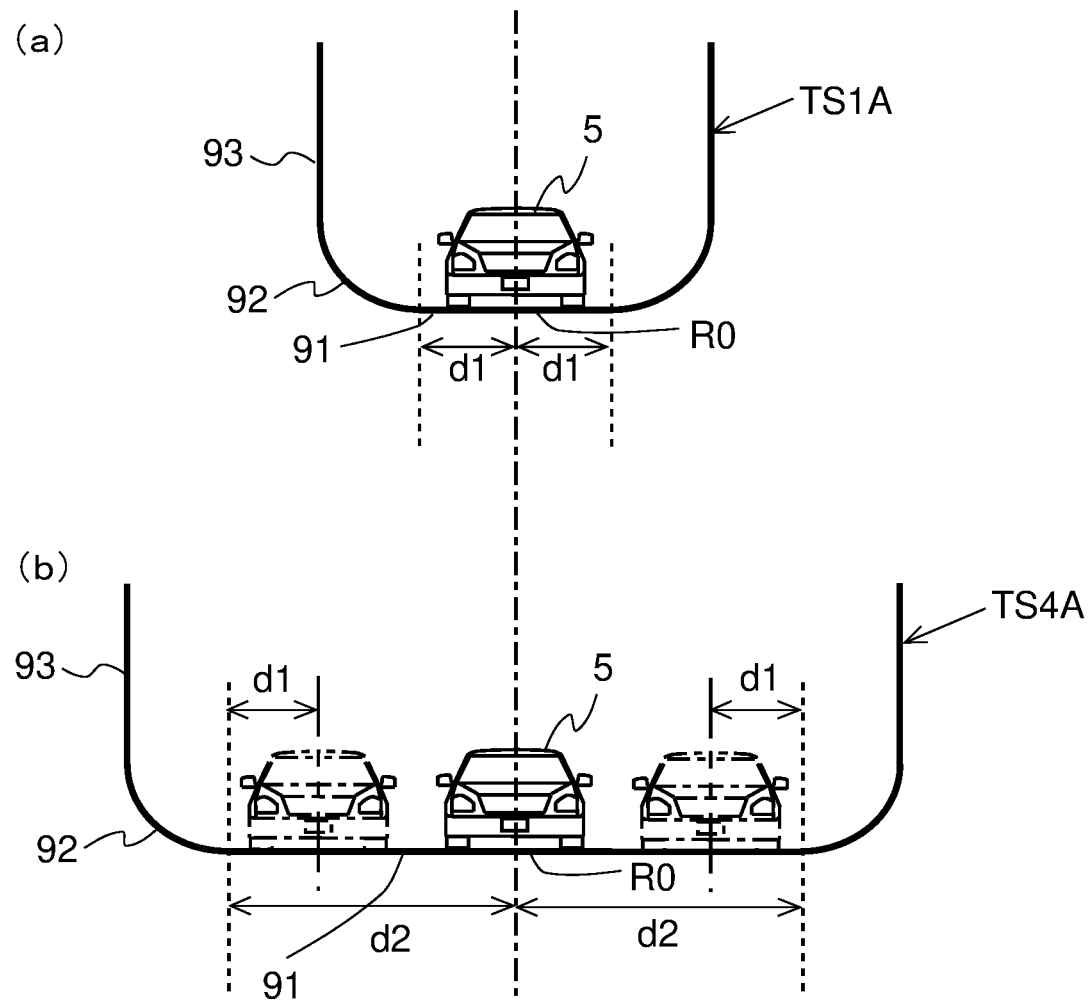
[Fig.11]

IMAGE PROCESSING DEVICE AND IMAGE PROCESSING METHOD

This application is based on Japanese Patent Application No. 2019-125424 filed on Jul. 4, 2019, the contents of which are hereby incorporated by reference.

BACKGROUND OF THE INVENTION

1. Field of the Invention

The present invention relates to an image processing device and an image processing method.

2. Description of Related Art

There is conventionally known a system that puts together a plurality of shot images taken by a plurality of cameras that shoot the surroundings of an observing vehicle (meaning a vehicle from which its surroundings are observed) to display a vehicle-surroundings image showing the surroundings of the observing vehicle as seen from a virtual viewpoint. For example, JP-A-2009-118416 discloses a technology for reducing the distortion of an obstacle appearing in a vehicle-surroundings image after viewpoint conversion in order to alleviate the unnaturalness felt by a driver.

The vehicle-surroundings image generating device disclosed in JP-A-2009-118416 includes a viewpoint conversion processor, an obstacle detector, and an image compression controller. The viewpoint conversion processor is fed with a plurality of images around a vehicle taken by a plurality of cameras, converts the viewpoint of those images by using mapping table information for viewpoint conversion, puts together the resulting images, and thereby generates a vehicle-surroundings image. The obstacle detector detects an obstacle around the vehicle and the distance from the vehicle to it. When the obstacle detector detects an obstacle, the image compression controller so operates as to compress, toward the center of the vehicle-surroundings image, the width of the image in the region of the vehicle-surroundings image located farther than the object as seen from the vehicle in the direction in which the obstacle is detected.

SUMMARY OF THE INVENTION

In the configuration disclosed in JP-A-2009-118416, the mapping table information for viewpoint conversion includes standard mapping table information and compression mapping table information. The standard mapping table information is used when no obstacle is detected. The compression mapping table information is used when an obstacle is detected. More specifically, the viewpoint conversion processor applies, when an obstacle is detected, the standard mapping table information to the image in the region located nearer than the object as seen from the observing vehicle and the compression mapping table information to the image in the region located farther than the object as seen from the observing vehicle.

That is, in the JP-A-2009-118416, it is necessary to appropriately determine in what combination to use the standard and compression mapping table information in accordance with the distance from the observing vehicle to the obstacle. This may lead to an increased burden of viewpoint conversion processing. As more obstacles are present around the observing vehicle, the burden of viewpoint conversion processing may further increase.

In view of the inconveniences mentioned above, an object of the present invention is to provide a technology for generating a composite image with little unnaturalness while restraining an increase in the burden of processing.

To achieve the above object, according to one aspect of the present invention, an image processing device used on a mobile body includes: a determiner configured to determine one out of a plurality of combination patterns as to the presence or absence of an object in a plurality of predetermined regions around the mobile body; and a generator configured to generate a composite image by projecting onto a virtual projection surface a plurality of shot images acquired by a plurality of cameras taking images of the surroundings of the mobile body. The generator is configured to select, out of a plurality of projection surfaces prepared beforehand, the projection surface used in generating the composite image in accordance with the combination pattern determined by the determiner.

According to another aspect of the present invention, an image processing method employed by an image processing device used on a mobile body includes: a determination step of determining one out of a plurality of combination patterns as to the presence or absence of an object in a plurality of predetermined regions around the mobile body; and a generation step of generating a composite image by projecting onto a virtual projection surface a plurality of shot images acquired by a plurality of cameras taking images of the surroundings of the mobile body. In the generation step, out of a plurality of projection surfaces prepared beforehand, the projection surface used in generating the composite image is selected in accordance with the combination pattern determined in the determination step.

BRIEF DESCRIPTION OF THE DRAWINGS

FIG. 1 is a block diagram showing a configuration of an image display system;

FIG. 2 is a schematic diagram showing a vehicle fitted with four cameras;

FIG. 3 is a diagram illustrating a method by which a generator generates a composite image;

FIG. 4 is a schematic diagram showing a position at which an image of an object present near an observing vehicle is projected in a case where the projection plane on which to project a shot image is a planar surface;

FIG. 5 is a schematic diagram showing a position at which an image of an object present near an observing vehicle is projected in a case where the projection plane on which to project a shot image is a planar surface;

FIG. 6 is a schematic diagram showing a position at which an image of an object present near an observing vehicle is projected in a case where the projection plane on which to project a shot image is a non-flat surface;

FIG. 7A is a diagram showing one example of a composite image in a case where the projection plane is a planar surface;

FIG. 7B is a diagram showing one example of a composite image in a case where the projection plane is a non-flat surface;

FIG. 8 is a diagram illustrating four projection planes;

FIG. 9 is a flow chart showing a procedure for generating and displaying a composite image at a scene of completion of parking;

FIG. 10A is a diagram showing a composite image generated by a generator on completion of parking;

FIG. 10B is a diagram showing a composite image generated by a generator on completion of parking;

FIG. 10C is a diagram showing a composite image generated by a generator on completion of parking;

FIG. 10D is a diagram showing a composite image generated by a generator on completion of parking; and FIG. 11 is a diagram illustrating a plurality of projection planes in a modified example.

DETAILED DESCRIPTION OF PREFERRED EMBODIMENTS

An illustrative embodiment of the present invention will be described below with reference to the accompanying drawings. While the following description deals with a case where the mobile body to which the present invention is applied is a vehicle, this is not meant to limit the application of the present invention to vehicles. The present invention can be applied to robots and the like as well. Vehicles encompass vehicles with wheels in general such as automobiles.

The different directions mentioned in the following description are defined as follows. The direction along the straight-movement line of the vehicle and pointing from the driver's seat to the steering wheel is referred to as the "front(ward) direction". The direction along the straight-movement line of the vehicle and pointing from the steering wheel to the driver's seat is referred to as the "rear(ward) direction". The direction perpendicular to both the straight-movement line of the vehicle and the plumb-vertical line and pointing from the right side to the left side of the driver facing in the front direction is referred to as the "left" direction. The direction perpendicular to both the straight-movement line of the vehicle and the plumb-vertical line and pointing from the left side to the right side of the driver facing in the front direction is referred to as the "right" direction. The terms "front, rear, left, and right directions" are used herein merely for describing purposes and are not meant as any limitation on positional relationships and directions in the real world.

1. Image Display System

FIG. 1 is a block diagram showing the configuration of an image display system 100 according to an embodiment of the present invention. The image display system 100 is a system used on a mobile body. More specifically, the image display system 100 is a system used on a vehicle. The image display system 100 has a function of generating an image showing a region around a vehicle on which the image display system 100 is mounted and displaying the image inside the vehicle cabin. In the following description, a vehicle on which the image display system 100 is mounted is often referred to as an "observing vehicle" (meaning a vehicle from which its surroundings are observed).

As shown in FIG. 1, the image display system 100 includes an image-taking section 1, an image processing device 2, a display device 3, and a parking ECU (electronic control unit) 4.

The image-taking section 1 shoots the surroundings of a mobile body. More specifically, the image-taking section 1 shoots the surroundings of an observing vehicle. The image-taking section 1 includes a plurality of cameras 11 to 14. In this embodiment, four cameras are provided. However, the image-taking section 1 can include any number of cameras. The cameras 11 to 14 feed shot images to the image processing device 2. That is, the image processing device 2 is fed with the shot images taken by the cameras 11 to 14.

FIG. 2 is a schematic diagram showing the vehicle 5 fitted with the four cameras 11 to 14. More specifically, the vehicle 5 is an automobile. As shown in FIG. 2, the camera 11 is disposed at the front end of the vehicle 5. Accordingly, the camera 11 is also called the front camera 11. The optical axis 11a of the front camera 11 runs along the front-rear axis of the vehicle 5 as seen in a plan view. The front camera 11 takes an image in the front direction of the vehicle 5. The camera 14 is disposed at the rear end of the vehicle 5. Accordingly, the camera 14 is also called the rear camera 14. The optical axis 14a of the rear camera 14 runs along the front-rear axis of the vehicle 5 as seen in a plan view. The rear camera 14 takes an image in the rear direction of the vehicle 5. Preferably, the front camera 11 and the rear camera 14 are fitted at the middle along the left-right axis of the vehicle 5; however, they can be fitted at a position displaced in the left or right direction from the middle along the left-right axis.

The camera 12 is disposed at the left-side door mirror 51 of the vehicle 5. Accordingly, this camera 12 is also called the left-side camera 12. The optical axis 12a of the left-side camera 12 runs along the left-right axis of the vehicle 5 as seen in a plan view. The left-side camera 12 takes an image in the left direction of the vehicle 5. The camera 13 is disposed at the right-side door mirror 52 of the vehicle 5. Accordingly, this camera 13 is also called the right-side camera 13. The optical axis 13a of the right-side camera 13 runs along the left-right axis of the vehicle 5 as seen in a plan view. The right-side camera 13 takes an image in the right direction of the vehicle 5. The left-side and right-side cameras 12 and 13 can be disposed elsewhere than at the door mirrors 51 and 52 on the body or the like of the vehicle 5.

Used as the lenses of the cameras 11 to 14 are, for example, fish-eye lenses. The cameras 11 to 14 each have an angle of view θ of 180 degrees or more on the horizontal plane. Thus, with the four cameras, it is possible to take an image of the surroundings all around the vehicle 5.

The image processing device 2 is used on a mobile body. More specifically, the image processing device 2 is used on a vehicle. The image processing device 2 is an electronic device that can perform various kinds of image processing. The image processing device 2 processes an image and feeds the processed image to the display device 3. The image processing device 2 is fed with signals from the parking ECU 4. In accordance with signals fed from the parking ECU 4, the image processing device 2 makes determinations on image processing. The image processing device 2 will be described in detail later.

The display device 3 includes a display such as a liquid crystal display with a function of being operated, for example, as a touch screen. The display device 3 displays the processed image fed from the image processing device 2. The display device 3 is disposed at such a position that a person inside the cabin (typically, the driver) can view the screen of the display. The display device 3 is arranged on the instrument panel of the vehicle 5.

The parking ECU 4 is an electronic control device that enables the observing vehicle to be parked autonomously in a parking lot. In the embodiment, the parking ECU 4 feeds predetermined information to the image processing device 2. The predetermined information includes, for example, information on the timing with which to start and end autonomous parking and the position at which to park the vehicle. The parking ECU 4 can be one that assists the driver in driving when parking the vehicle 5 in a parking lot.

2. Configuration of Image Processing Device

The image processing device 2 is configured as an ECU (electronic control unit). As shown in FIG. 1, the image processing device 2 includes an image acquirer 21, a controller 22, an image feeder 23, a signal receiver 24, and a storage 25.

The image acquirer 21 acquires the shot images taken by the four cameras 11 to 14 respectively. If the acquired shot images are analog images, the image acquirer 21 converts the analog shot images into digital shot images (analog-to-digital conversion). The image acquirer 21 performs predetermined image processing on the acquired shot images, and feeds the processed shot images to the controller 22.

The controller 22 is, for example, a microcomputer, and controls the entire image processing device 2 in a centralized manner. The controller 22 includes a CPU (central processing unit), a RAM (random-access memory), a ROM (read-only memory), and the like. More specifically, the controller 22 includes a determiner 221, a generator 222, and a display processor 223. The functions of these blocks 221 to 223 provided in the controller 22 are attained, for example, by the CPU performing data processing according to computer programs stored in the storage 25. In other words, the image processing device 2 is provided with the determiner 221, the generator 222, and the display processor 223.

At least one of the blocks 221 to 223 provided in the controller 22 can be configured as hardware such as an ASIC (application-specific integrated circuit) or an FPGA (field-programmable gate array). The blocks 221 to 223 provided in the controller 22 are conceptual components. A function performed by one component can be distributed among a plurality of components, or functions of a plurality of components can be consolidated into one component. The image acquirer 21 can be configured such that its function is attained by the CPU in the controller 22 performing data processing according to a computer program.

The determiner 221 determines one out of a plurality of combination patterns as to the presence or absence of an object in a plurality of predetermined regions around the mobile body. More specifically, at a particular scene, the determiner 221 determines one out of a plurality of combination patterns as to the presence or absence of an object in a plurality of predetermined regions around the observing vehicle 5. In the embodiment, the particular scene is a scene of completion of parking (parking completion scene). In this case, the predetermined regions include a first region corresponding to the parking space next to the mobile body on its right side and a second region corresponding to the parking space next to the mobile body on its left side. Thus, in other words, the determiner 221 recognizes one out of a plurality of combination patterns as to the presence or absence of another vehicle parked in two parking spaces next to the mobile body on its left and right sides.

Here, an object is preferably, but not limited to, an object at rest. An object that is too small compared with a predetermined region can be excluded from the target of determination. An object can be, for example, a vehicle. Whether or not an object is a vehicle can be determined by use of well-known image recognition technology.

Whether or not an object is present in a predetermined region can be determined based on the distance from the observing vehicle 5 to the object. In this case, if an object is present within a predetermined distance range, it is determined that an object is present in the predetermined region; if no object is present within the predetermined distance range, it is determined that no object is present in the predetermined region. The distance from the observing vehicle 5 to the object can be found based on the shot images fed from the cameras 11 to 14. Instead, the distance from the observing vehicle 5 to the object can be found by use of a sensor other than the cameras 11 to 14. Example of such sensors include, for example, ultrasonic sensors, radar sensors, and LIDAR (laser imaging detection and ranging) sensors. In a case where a sensor other than cameras is used, the image display system 100 is provided with a sensor other than the cameras 11 to 14.

In the embodiment, the plurality of combination patterns include a first pattern, a second pattern, a third pattern, and a fourth pattern. The first pattern is a pattern where an object is present next to the mobile body on both sides of it. The second pattern is a pattern where an object is present next to the mobile body on one side of it. The third pattern is a pattern where an object is present next to the mobile body on the other side of it. The fourth pattern is a pattern where no object is present next to the mobile body on either side of it. In the embodiment, the scene at which the determiner 221 is required to make a determination is limited to a parking completion scene. This permits different patterns of an object being present around the mobile body to be classified into a small number of patterns. This helps reduce the burden of processing on the CPU. Although there are two predetermined regions in the embodiment, there can in practice be three or more predetermined regions, and with the number of predetermined regions the number of combination patterns varies.

More specifically, the first pattern is a pattern where a neighboring vehicle is present next to the observing vehicle 5 on both its left and right sides. When a vehicle is present within a predetermined distance on each of the left and right sides of the observing vehicle 5, the determiner 221 determines that the first pattern applies. The second pattern is a pattern where a neighboring vehicle is present next to the observing vehicle 5 on its left side. When a vehicle is present within a predetermined distance next to the observing vehicle 5 only on, out of its left and right sides, the left side, the determiner 221 determines that the second pattern applies. The third pattern is a pattern where a neighboring vehicle is present next to the observing vehicle 5 on its right side. When a vehicle is present within a predetermined distance next to the observing vehicle 5 only on, out of its left and right sides, the right side, the determiner 221 determines that the third pattern applies. The fourth pattern is a pattern where no neighboring vehicle is present next to the observing vehicle 5 on both its left and right sides. When no vehicle is present within a predetermined distance on either the left or right side of the observing vehicle 5, the determiner 221 determines that the fourth pattern applies. Here, the predetermined distance can be any distance required to sense whether or not another vehicle is present in the parking spaces next to the observing vehicle 5 on its left and right sides, and is a distance of, for example, about one meter to two meters.

The generator 222 projects a plurality of shot images acquired by the cameras 11 to 14, which shoot the surroundings of the mobile body, onto a virtual projection surface, and thereby generates a composite image. In the embodiment, the generator 222 projects four shot images acquired by the cameras 11 to 14, which shoot the surroundings of the observing vehicle 5, onto a virtual projection surface, and thereby generates a composite image. The generator 222 changes part of its processing between at a particular scene and at scenes other than the particular scene. When the generator 222 recognizes the particular scene, the generator 222 automatically generates the composite image. When the generator 222 does not recognize the particular scene (at scenes other than the particular scene), the generator 222 generates the composite image, for example, in response to an instruction from a user such as the driver. The generator 222 can be configured to generate the composite image only at the particular scene. The generator 222 can be configured to generate the composite image also at scenes other than the particular scene on fulfillment of a particular condition.

At the particular scene, the generator 222 performs processing for generating the composite image based on the result of the determination by the determiner 221. In accordance with the combination pattern determined by the determiner 221, the generator 222 selects, out of a plurality of projection surfaces defined beforehand, a projection surface to be used in generating the composite image. By using the selected projection surface, the generator 222 generates the composite image. With this configuration, it is possible to generate, in accordance with the circumstances around the observing vehicle 5 at the particular scene, an appropriate composite image that is not felt unnatural by the driver or the like, with a reduced burden of processing.

In the embodiment, the particular scene is a parking completion scene. That is, when the generator 222 recognizes completion of parking of the vehicle 5, the generator 222 selects one projection surface out of the plurality of projection surfaces. Then, by using the selected projection surface, the generator 222 generates a composite image. With this configuration, which generates a composite image that is not felt unnatural by the driver or the like only at a limited specific scene, namely a parking completion scene, it is possible to reduce the burden of processing for generating the composite image and the burden of capacity for the storage of the data needed for that. The processing at the parking completion scene will be described in detail later.

On the other hand, at a scene other than the particular scene (in the embodiment, other than a parking completion scene), the generator 222 performs processing for generating the composite image irrespective of the result of the determination by the determiner 221. In the embodiment, at scenes other than the particular scene, the generator 222 uses a projection surface different from the plurality of projection surfaces from which a selected one is used at the particular scene. The controller 22 can also share, at scenes other than the particular scene, any of the plurality of projection surfaces used at the particular scene.

A description will now be given of the processing for generating a composite image taking an example where a projection surface used at a scene other than the particular scene is used. FIG. 3 is a diagram illustrating a method by which the generator 222 generates a composite image.

By the front camera 11, the left-side camera 12, the right-side camera 13, and the rear camera 14, four shot images that are images in the front, left, right, and rear directions, respectively, relative to the observing vehicle 5 are acquired simultaneously. These four shot images P11 to P14 include the data of the surroundings all around the observing vehicle 5. The generator 222 acquires these four shot images P11 to P14.

The generator 222 projects the data (values of pixels) contained in the four shot images P11 to P14 onto a projection surface TS in a virtual three-dimensional space. The projection surface TS is a virtual non-flat surface corresponding to a region around the observing vehicle 5. The projection surface TS has a hemispherical shape (the shape of a bowl or pan), and a central part of it (the part corresponding to the base of the bowl or pan) is defined as a vehicle region RO, which indicates the position of the observing vehicle 5. On the projection surface TS, the data of the shot images is not projected in the vehicle region RO; the data of the shot images is projected in a region (projection target region) outside the vehicle region RO.

The correspondence between the positions of the pixels contained in the shot images P11 to P14 and the positions of the pixels on the projection surface TS is defined beforehand. This correspondence is defined in table data stored in the storage 25. The values of the pixels on the projection surface TS can be determined based on the just-mentioned correspondence and the values of the pixels contained in the shot images P11 to P14.

The generator 222 allots the data of the shot image P11 of the front camera 11 to a part PF of the projection target region corresponding to the front side of the observing vehicle 5. The generator 222 allots the data of the shot image P12 of the rear camera 12 to a part PB of the projection target region corresponding to the rear side of the observing vehicle 5. The generator 222 allots the data of the shot image P13 of the left camera 13 to a part PL of the projection target region corresponding to the left side of the observing vehicle 5. The generator 222 allots the data of the shot image P14 of the right camera 14 to a part PR of the projection target region corresponding to the right side of the observing vehicle 5.

Having so allotted the data of the shot images to different parts of the projection target region on the projection surface TS, the generator 222 then virtually constructs a model of a polygon that represents the three-dimensional shape of the observing vehicle 5. The model of the observing vehicle 5 is allocated in the vehicle region RO, which indicates the position of the observing vehicle 5 in the three-dimensional space in which the projection surface TS is set.

Subsequently, the generator 222 sets a virtual viewpoint VP in the three-dimensional space. The virtual viewpoint VP is defined with the position of a view point and the direction of a line of sight. The generator 222 can set in the three-dimensional space a virtual viewpoint VP with any viewpoint position and any sight-line direction. The virtual viewpoint VP is set, for example, in response to an instruction from the user. In accordance with the set virtual viewpoint VP, the generator 222 cuts out a necessary region on the projection surface TS. In accordance with the set virtual viewpoint VP, the generator 222 also performs rendering on the model of the observing vehicle 5, and overlays the cut-out image with a two-dimensional vehicle image 50 that results from the rendering. In this way, a composite image CP that shows the observing vehicle 5 and a region around the observing vehicle 5 as seen from the virtual viewpoint VP is generated.

For example, as shown in FIG. 3, suppose a virtual viewpoint VPa with a viewpoint position straight above the observing vehicle 5 and a sight-line direction straight downward. This generates a composite image CPa (an overhead view) that looks down on the observing vehicle 5 and its surroundings. For another example, suppose a virtual viewpoint VPb with a viewpoint position at the rear left side of the observing vehicle 5 and a sight-line direction frontward of the observing vehicle 5. This generates a composite image CPa that shows the observing vehicle 5 and its surroundings as seen from the rear left side of the observing vehicle 5.

As shown back in FIG. 1, the display processor 223 performs processing for displaying images including the composite image CP. More specifically, the display processor 223 generates a display image to be displayed on the display device 3 by using the composite image CP generated by the generator 222 and the shot images acquired by the image acquirer 21.

The image feeder 23 feeds the display image generated by the display processor 223 to the display device 3. Thus the display device 3 displays the composite image CP and the shot images.

The signal receiver 24 receives signals from the parking ECU 4, and feeds the received signals to the controller 22. Based on the received signals, the controller 22 performs processing necessary to make the display device 3 display a composite image at a parking completion scene.

The storage 25 is, for example, a non-volatile memory such as a flash memory, and stores various kinds of information. The storage 25 stores programs as firmware as well as various kinds of data used to generate the composite image CP. The data used to generate the composite image CP includes a plurality of sets of projection surface data 25a.

3. Generation of Composite Image at Parking Completion Scene 3-1. Relationship Between Projection Surface and Shot Images FIGS. 4 and 5 are each a schematic diagrams showing, for a case where the projection surface on which the shot images are projected is a planar surface 200, the position at which an image of an object 6 that is present near the observing vehicle 5 is projected. FIGS. 4 and 5 differ in the height of the object 6 relative to the road surface on which the observing vehicle 5 lies. The object 6 is located at a lower position in FIG. 5 than in FIG. 4.

The image of the object 6 obtained by the left-side camera 12 shooting the object 6 is projected at the position at which the straight line connecting between the position of the left-side camera 12 and the position of the object 6 intersects the projection surface 200. As will be understood by comparing FIGS. 4 and 5, the higher the position of the object 6 relative to the road surface, the longer stretched it is projected to be. That is, an object 6 at a higher position relative to the road surface tends to be enlarged more on the projection surface 200.

FIG. 6 is a schematic diagram showing, for a case where the projection surface on which the shot images are projected is a non-flat surface 300, the position at which an image of an object 6 that is present near the observing vehicle 5 is projected. In FIG. 6, the object 6 is located at as high a position relative to the road surface as the object 6 in FIG. 4. The projection surface 300 is flat at and near around where the observing vehicle 5 lies and is curved starting at a position predetermined distance away from the position of the observing vehicle 5. The curved surface is increasingly high relative to the flat surface the farther away from the observing vehicle 5. In the following description, the position of the boundary between the flat and curved surfaces on the projection surface is sometimes called the rising position.

As will be understood by comparing FIGS. 4 and 6, as compared with projection on the projection surface 200, projection on the projection surface 300 diminishes the stretch on the projection surface. That is, using the projection surface 300 as the projection surface tends to diminish the degree of an object 6 being enlarged on the projection surface.

FIG. 7A is a diagram showing one example of a composite image CP obtained with a flat surface 200 as the projection surface. FIG. 7B is a diagram showing one example of a composite image CP obtained with a non-flat surface 300 as the projection surface. FIGS. 7A and 7B show composite images CP with a virtual viewpoint VP assumed to have a viewpoint position frontward of the observing vehicle 5 and a sight-line direction rearward of the observing vehicle 5.

In FIG. 7A, where a flat surface 200 is used as the projection surface, due to the tendency shown in FIGS. 4 and 5, the image 70 of a neighboring vehicle present on the left side of the observing vehicle 5 is distorted. In contrast, in FIG. 7B, where a non-flat surface 300 is used as the projection surface, the image 70 of a neighboring vehicle present on the left side of the observing vehicle 5 has distortion reduced, whereas, in FIG. 7B, the image 8 of the white line behind the observing vehicle 5 is distorted.

3-2. Projection Surface. At Parking Completion Scene

The circumstances around the observing vehicle 5 at a parking completion scene can be classified into one of the first to fourth patterns described previously. In a composite image CP at a parking completion scene, it is preferable that, in a direction in which no neighboring vehicle is present, the image 8 of the white line be shown straight so that it is possible to check whether parking has been done properly with respect to the white line on the road surface. Moreover, in a composite image CP at a parking completion scene, it is preferable that, in a direction in which a neighboring vehicle is present, the image 70 of the neighboring vehicle appear less unnatural as a result of being enlarged or otherwise.

Out of the above considerations, in the embodiment, a plurality of projection surfaces from which a selected projection surface is used to generate a composite image CP at a parking completion scene are prepared beforehand. In accordance with the result of determination by the determiner 221, the generator 222 selects, from the plurality of projection surfaces, one projection surface to be used. More specifically, the plurality of projection surfaces include a projection surface for the first pattern, a projection surface for the second pattern, a projection surface for the third pattern, and a projection surface for the fourth pattern. Preferably, these projection surfaces are so designed that the composite image CP is not vignetted (has no part without any image). This improves the appearance of the composite image CP.

When the determiner 221 determines that the combination pattern is the first pattern, the generator 222 selects the projection surface for the first pattern. When the determiner 221 determines that the combination pattern is the second pattern, the generator 222 selects the projection surface for the second pattern. When the determiner 221 determines that the combination pattern is the third pattern, the generator 222 selects the projection surface for the third pattern. When the determiner 221 determines that the combination pattern is the fourth pattern, the generator 222 selects the projection surface for the fourth pattern.

FIG. 8 is a diagram illustrating the four projection surfaces TS1 to TS4. FIG. 8 is a vertical sectional view of the projection surfaces TS1 to TS4 as cut at the middle position along the front-rear axis. For the sake of convenience, FIG. 8 shows the observing vehicle 5 as well to make it easy to grasp the vehicle region RO. As shown in FIG. 8, the projection surfaces TS1 to TS4 have a flat segment 91 and a curved segment 92. In the embodiment, the four projection surfaces TS1 to TS4 each have a flat segment 91, a curved segment 92, and a vertical segment 93. The projection surfaces TS1 to TS4 are each generally in the shape of a bowl or pan.

The flat segment 91 is located at and near the position where a mobile body lies. In the embodiment, the flat segment 91 is located at and near the position where the observing vehicle 5 lies. That is, on the projection surfaces TS1 to TS4, the vehicle region RO is located within the flat segment 91. The flat segment 91 has, for example, an elliptical shape shorter along the left-right axis than along the front-rear axis.

The curved segment 92 connects to the flat segment 91. More specifically, the curved segment 92 extends outward from all around the circumference of the flat segment 91. The curved segment 92 has a uniform shape around the entire circumference of the flat segment 91. The curved segment 92 is increasingly high relative to the flat segment 91 the farther away from the observing vehicle 5 (one example of a mobile body). The vertical segment 93 extends, from the end of the curved segment 92 opposite from the flat segment 91, in the direction perpendicular to the flat segment 91. As the case may be, the vertical segment 93 can be omitted.

Among the plurality of projection surfaces TS1 to TS4, the positional relationship between the mobile body and the curved segment 92 differs. More specifically, among the four projection surfaces TS1 to TS4, the positional relationship between the observing vehicle 5 and the curved segment 92 differs. By selectively using the four differently configured projection surfaces TS1 to TS4 in accordance with the four combination patterns discriminated by the determiner 221, it is possible to generate composite images CP that suit those combination patterns.

In FIG. 8, at (a) is shown the projection surface TS1 for the first pattern. The first pattern is a pattern where a neighboring vehicle is present on both the left and right sides of the observing vehicle 5. In this case, in the composite image CP showing the parking completion scene, it is preferable that the image 70 of the neighboring vehicle present on both the left and right sides of the observing vehicle 5 have distortion reduced. Accordingly, the projection surface TS1 for the first pattern is configured so that, on both the left and right sides of the observing vehicle 5, the distance from the observing vehicle 5 to the rising position of the curved segment 92 is so short that the data of the image is projected also on the curved segment 92. On the projection surface TS1 for the first pattern, the vehicle region RO is located in the middle of the flat segment 91 along the left-right axis. The distance from the middle position of the observing vehicle 5 along the left-right axis to the rising position is equal (=d1) on the left and right sides.

In FIG. 8, at (b) is shown the projection surface TS2 for the second pattern. The second pattern is a pattern where a neighboring vehicle is present on the left side of the observing vehicle 5. In this case, in the composite image CP showing the parking completion scene, it is preferable that the image 70 of the neighboring vehicle present on the left side of the observing vehicle 5 has distortion reduced. Accordingly, on the projection surface TS2 for the second pattern, on the left side of the observing vehicle 5, the distance from the observing vehicle 5 to the rising position of the curved segment 92 is so short that the data of the image is projected also on the curved segment 92. On the projection surface TS2 for the second pattern, the vehicle region RO is located leftward of the middle of the flat segment 91 along the left-right axis. In the embodiment, with respect to the middle position of the observing vehicle 5 along the left-right axis, on the left side of the observing vehicle 5, the distance to the rising position of the curved segment 92 is equal (=d1) to that on the projection surface TS1 for the first pattern.

On the other hand, in the second pattern, in the composite image CP showing the parking completion scene, since no neighboring vehicle is present on the right side of the observing vehicle 5, it is preferable that, on the right side of the observing vehicle 5, the image 8 of the white line be shown straight. Accordingly, the projection surface TS2 for the second pattern is configured so that, on the right side of the observing vehicle 5, the distance from the observing vehicle 5 to the rising position of the curved segment 92 is so long that the data of the image is projected on the flat segment 91. In the embodiment, with respect to the middle position of the observing vehicle 5 along the left-right axis, on the right side of the observing vehicle 5, the distance to the rising position of the curved segment 92 is longer (=d2) than the distance (=d1) on the projection surface TS1 for the first pattern.

In FIG. 8, at (c) is shown the projection surface TS3 for the third pattern. The third pattern is a pattern where a neighboring vehicle is present on the right side of the observing vehicle 5. In this case, in the composite image CP showing the parking completion scene, it is preferable that the image 70 of the neighboring vehicle present on the right side of the observing vehicle 5 has distortion reduced. Accordingly, on the projection surface TS3 for the third pattern, on the right side of the observing vehicle 5, the distance from the observing vehicle 5 to the rising position of the curved segment 92 is so short that the data of the image is projected also on the curved segment 92. On the projection surface TS3 for the third pattern, the vehicle region RO is located rightward of the middle of the flat segment 91 along the left-right axis. In the embodiment, with respect to the middle position of the observing vehicle 5 along the left-right axis, on the right side of the observing vehicle 5, the distance to the rising position of the curved segment 92 is equal (=d1) to that on the projection surface TS1 for the first pattern.

On the other hand, in the third pattern, in the composite image CP showing the parking completion scene, since no neighboring vehicle is present on the left side of the observing vehicle 5, it is preferable that, on the left side of the observing vehicle 5, the image 8 of the white line be shown straight. Accordingly, the projection surface TS3 for the third pattern is configured so that, on the left side of the observing vehicle 5, the distance from the observing vehicle 5 to the rising position of the curved segment 92 is so long that the data of the image is projected on the flat segment 91. In the embodiment, with respect to the middle position of the observing vehicle 5 along the left-right axis, on the left side of the observing vehicle 5, the distance to the rising position of the curved segment 92 is longer (=d2) than the distance (=d1) on the projection surface TS1 for the first pattern.

In FIG. 8, at (d) is shown the projection surface TS4 for the fourth pattern. The fourth pattern is a pattern where no neighboring vehicle is present on both the left and right sides of the observing vehicle 5. In this case, in the composite image CP showing the parking completion scene, it is preferable that, on both the left and right sides of the observing vehicle 5, the image 8 of the white line is shown straight. Accordingly, the projection surface TS4 for the fourth pattern is configured so that, on both the left and right sides of the observing vehicle 5, the distance from the observing vehicle 5 to the rising position of the curved segment 92 is so long that the data of the image is projected on the flat segment 91. On the projection surface TS4 for the fourth pattern, the vehicle region RO is located in the middle of the flat segment 91 along the left-right axis. This is the same as on the projection surface TS1 for the first pattern. Here, however, the dimension of the flat segment 91 along the left-right axis differs. The distance from the middle position of the observing vehicle 5 along the left-right axis to the rising position is equal (=d2) on the left and right sides, and is longer than the distance d1 on the projection surface TS1 for the first pattern. The distance d2 is equal to the distance to the rising position on the right side of the observing vehicle 5 on the projection surface TS2 for the second pattern and the distance to the rising position on the left side of the observing vehicle 5 on the projection surface TS3 for the third pattern.

In the embodiment, different circumstances around the observing vehicle 5 at a parking completion scene are roughly classified into a plurality of patterns, and projection surfaces TS1 to TS4 respectively corresponding to them are prepared beforehand. This makes it possible, while reducing the number of projection surfaces TS1 to TS4 prepared beforehand, to generate a composite image CP with a good appearance that suits the circumstances around the observing vehicle 5. Reducing the number of projection surfaces TS1 to TS4 prepared beforehand helps reduce the storage capacity of the storage 25. The configuration where the projection surfaces TS1 to TS4 are prepared beforehand helps reduce the burden of processing for generating the composite image CP as compared with the configuration where a projection surface is generated in accordance with the distance to a neighboring vehicle. The configuration where the projection surfaces TS1 to TS4 as well as the viewpoint position and the sight-line direction are prepared beforehand helps prevent the composite image CP from being vignetted.

3.3 Processing for Generating And Displaying Composite Image. At Parking Completion Scene FIG. 9 is a flow chart showing a procedure of the processing for generating and displaying a composite image CP at a parking completion scene. In the embodiment, when the controller 22 receives a notification of the start of autonomous parking from the parking ECU 4 via the signal receiver 24, the determiner 221 starts to acquire information on the distance to an object (in this example, a vehicle) present on the left and right sides of the planned parking space (step S1). That is, during the movement of the observing vehicle 5 prior to completion of parking of the observing vehicle 5, the determiner 221 starts to collect information for determining a combination pattern. This permits prompt display of a composite image CP at the parking completion scene on the display device 3 on completion of parking.

The determiner 221 acquires the planned parking space from the parking ECU 4. The determiner 221 can start to acquire information on the distance to an object in response to, instead of a notification of the start of autonomous parking from the parking ECU 4, for example, an operation on the shift lever. In the embodiment, during autonomous parking, not the composite image CP at the parking completion scene but, for example, the shot image taken by the rear camera 14 is displayed on the display device 3. That is, before completion of parking of the observing vehicle 5, the display processor 223 performs processing for displaying an image that is different from the composite image CP using whichever of the projection surfaces TS1 to TS4 suits the given combination pattern. It is thus possible to display an appropriate image that suits a given scene with a light burden of processing.

Subsequently, the determiner 221 checks whether or not parking of the observing vehicle 5 is complete (step S2). In the embodiment, whether or not parking of the observing vehicle 5 is complete is determined based on whether or not a notification of the completion of parking is received from the parking ECU 4. Whether or not parking of the observing vehicle 5 is complete can instead be determined based on information on operation on the shift lever.

If parking of the observing vehicle 5 is not complete (No in step 2), then, back at step S1, the determiner 221 acquires distance information again, and updates the previously acquired distance information. By contrast, if parking of the observing vehicle 5 is complete (Yes in step S2), the determiner 221 determines a combination pattern based on the previously acquired distance information (step S3).

When a vehicle is present within the predetermined distance on each of the left and right sides of the observing vehicle 5, the determiner 221 determines that the first pattern, with a neighboring vehicle on both sides, applies. When a vehicle is present within the predetermined distance on the left side of the observing vehicle 5 and no vehicle is present within the predetermined distance on the right side of the observing vehicle 5, the determiner 221 determines that the second pattern, with a neighboring vehicle only on the left side, applies. When no vehicle is present within the predetermined distance on the left side of the observing vehicle 5 and a vehicle is present within the predetermined distance on the right side of the observing vehicle 5, the determiner 221 determines that the third pattern, with a neighboring vehicle only on the right side, applies. When no vehicle is present within the predetermined distance on either the left or right side of the observing vehicle 5, the determiner 221 determines that the fourth pattern, with no neighboring vehicle on both sides, applies.

After the determination of the combination pattern by the determiner 221, based on the combination pattern, the generator 222 selects one of the projection surfaces TS1 to TS4 (step S4). If the combination pattern is the first pattern, the generator 222 selects the projection surface TS1 for the first pattern. If the combination pattern is the second pattern, the generator 222 selects the projection surface TS2 for the second pattern. If the combination pattern is the third pattern, the generator 222 selects the projection surface TS3 for the third pattern. If the combination pattern is the fourth pattern, the generator 222 selects the projection surface TS4 for the fourth pattern.

Using the selected one of the projection surfaces TS1 to TS4, the generator 222 generates a composite image CP (step S5). The processing for generating the composite image is similar to the processing that uses the projection surface TS employed at scenes other than a parking completion scene. The virtual viewpoint VP can be a position determined beforehand, or can be a position set by the user. Preferably, the virtual viewpoint VP is set at such a position that the observing vehicle 5 is viewed from obliquely above.

After the generation of the composite image CP by the generator 222, the display device 3 displays the image (step S6). More specifically, using the composite image CP generated by the generator 222, the display processor 223 generates a display image to be displayed on the display device 3. That is, after completion of parking of the observing vehicle 5, the display processor 223 performs processing for displaying the composite image using whichever of the projection surfaces TS1 to TS4 suits the combination pattern. The display image generated by the display processor 223 is fed from the image feeder 23 to the display device 3, and the display device 3 displays the composite image CP.

FIGS. 10A, 10B, 10C, and 10D are diagrams each showing the composite image CP generated by the generator 222 on completion of parking. FIG. 10A to 10D all show a composite image with the virtual viewpoint VP assumed to have a viewpoint position frontward of the observing vehicle 5 and a sight-line direction rearward of the observing vehicle 5. This is merely illustrative, and the position of the virtual viewpoint VP can by altered as necessary.

FIG. 10A shows a composite image CP obtained in a case where a neighboring vehicle is present next to the observing vehicle 5 on both its sides. Selected in this case is the projection surface TS1 for the first pattern with a short distance to the rising position on each of the left and right sides of the observing vehicle 5. This results in an image with a good appearance in which the image 70 of the neighboring vehicle has distortion reduced on both the left and right sides of the observing vehicle 5.

FIG. 10B shows a composite image CP obtained in a case where a neighboring vehicle is present next to the observing vehicle 5 only on its left side. Selected in this case is the projection surface TS2 for the second pattern with a short distance to the rising position on the left side of the observing vehicle 5 and a long distance to the rising position on the right side of the observing vehicle 5. This results in an image with a good appearance in which the image 70 of the neighboring vehicle has distortion reduced on the left side of the observing vehicle 5 and in which the image 8 of the white line appears straight on the right side of the observing vehicle 5.

FIG. 10C shows a composite image CP obtained in a case where a neighboring vehicle is present next to the observing vehicle 5 only on its right side. Selected in this case is the projection surface TS3 for the third pattern with a long distance to the rising position on the left side of the observing vehicle 5 and a short distance to the rising position on the right side of the observing vehicle 5. This results in an image with a good appearance in which the image 8 of the white line appears straight on the left side of the observing vehicle 5 and in which the image 70 of the neighboring vehicle has distortion reduced on the right side of the observing vehicle 5.

FIG. 10D shows a composite image CP obtained in a case where no neighboring vehicle is present on both sides of the observing vehicle 5. Selected in this case is the projection surface TS4 for the fourth pattern with a long distance to the rising position on each of the left and right sides of the observing vehicle 5. This results in an image with a good appearance in which the image 8 of the white line appears straight on both the left and right sides of the observing vehicle 5.

In the embodiment, even if a neighboring vehicle moves away after completion of parking, no switching among the projection surfaces TS1 to TS4 is performed. It is considered unlikely that the presence or absence of a neighboring vehicle changes after completion of parking before the display of a composite image CP. Thus, according to the embodiment, it is possible to reduce the burden of processing with little practical disadvantage.

4. Modified Example

Also in a modified example, the generator 222 selects, out of a plurality of projection surfaces prepared beforehand for a plurality of combination patterns, a projection surface to be used in generating a composite image. The plurality of combination patterns include, as in the embodiment described previously, a first pattern, a second pattern, a third pattern, and a fourth pattern. Here, however, not four but two projection surfaces are prepared beforehand for the four combination patterns.

FIG. 11 is a diagram illustrating the plurality of projection surfaces in the modified example. FIG. 11 is a vertical sectional view of the projection surfaces as cut at the middle position along the front-rear axis. For the sake of convenience, FIG. 11 shows the observing vehicle 5 as well to make it easy to grasp the vehicle region RO.

In the modified example, as shown in FIG. 11, the plurality of projection surfaces include a projection surface TS1A for the first pattern and a shared projection surface TS4A selected for the second, third, and fourth patterns. The projection surface TS1A for the first pattern shown at (a) in FIG. 11 has the same shape as the projection surface TS1 for the first pattern shown at (a) in FIG. 8 referred to earlier. When the determiner 221 determines that the combination pattern is the first pattern, the generator 222 selects the projection surface TS1A. On the projection surface TS1A for the first pattern, the vehicle region RO is located in the middle of the flat segment 91 along the left-right axis. The processing for generating the composite image CP after the selection of the projection surface TS1A is similar as in the embodiment described previously.

The shared projection surface TS4A shown at (b) in FIG. 11 has the same shape as the projection surface TS4 for the fourth pattern shown at (d) in FIG. 8 referred to earlier. In the shared projection surface TS4A, the flat segment 91 is wider along the left-right axis than that on the projection surface TS1 for the first pattern. When the determiner 221 determines that the combination pattern is the second, third, or fourth pattern, the generator 222 selects the shared projection surface TS4A. When the shared projection surface TS4A is selected, the generator 222 generates the composite image CP while changing the position of the observing vehicle 5 (one example of a mobile body) on the shared projection surface TS4A in accordance with the combination pattern.

When the combination pattern is the fourth pattern, the generator 222 uses the shared projection surface TS4A on the assumption that the vehicle region RO (the position of the observing vehicle 5) is located in the middle of the flat segment 91 along the left-right axis. On each of the left and right sides, the distance (=d2) from the middle position of the observing vehicle 5 along the left-right axis to the rising position of the curved segment 92 is longer than the distance (=d1) on the projection surface TS1A for the first pattern. For example, in the case of the fourth pattern, in accordance with table data that defines the correspondence of pixel positions between the shot images and the shared projection surface TS4A, the data of the shot images is allocated to the shared projection surface TS4A. The subsequent processing for generating the composite image CP is similar to that in the embodiment described previously.

When the combination pattern is the second pattern, the generator 222 uses the shared projection surface TS4A on the assumption that the vehicle region RO is located at a position displaced leftward from the middle of the flat segment 91 along the left-right axis. The amount of displacement here is determined beforehand. For example, the vehicle region RO is displaced such that, with respect to the middle position of the observing vehicle 5 along the left-right axis, the distance to the rising position of the curved segment 92 on the left side of the observing vehicle 5 is equal to the distance (=d1) on the projection surface TS1 for the first pattern. Here, the distance to the rising position of the curved segment 92 on the right side of the observing vehicle 5 is longer (>d2) than the distance in the case of the fourth pattern. For example, the data of the shot images is allocated to pixel positions displaced from the corresponding pixel positions on the shared projection surface TS4A for the fourth pattern by the amount corresponding to the amount of displacement of the vehicle region RO. The subsequent processing for generating the composite image CP is similar as in the embodiment described previously.

When the combination pattern is the third pattern, the generator 222 uses the shared projection surface TS4A on the assumption that the vehicle region RO is located at a position displaced rightward from the middle of the flat segment 91 along the left-right axis. The amount of displacement here is determined beforehand. For example the vehicle region RO is displaced such that, with respect to the middle position of the observing vehicle 5 along the left-right axis, the distance to the rising position of the curved segment 92 on the right side of the observing vehicle 5 is equal to the distance (=d1) on the projection surface TS1 for the first pattern. Here, the distance to the rising position of the curved segment 92 on the left side of the observing vehicle 5 is longer (>d2) than the distance in the case of the fourth pattern. For example, the data of the shot images is allocated to pixel positions displaced from the corresponding pixel positions on the shared projection surface TS4A for the fourth pattern by the amount corresponding to the amount of displacement of the vehicle region RO. The subsequent processing for generating the composite image CP is similar as in the embodiment described previously.

According to the modified example, it is possible to reduce the amount of projection surface data 25a stored in the storage 25. That is, it is possible to reduce the storage capacity of the storage 25.

5. Overview

As described above, an illustrative image processing device 2 according to one aspect of the present invention is an image processing device used on a mobile body 5, and includes: a determiner 221 configured to determine one out of a plurality of combination patterns as to the presence or absence of an object in a plurality of predetermined regions around the mobile body 5; and a generator 222 configured to generate a composite image by projecting onto a virtual projection surface a plurality of shot images acquired by a plurality of cameras 11 to 14 taking images of the surroundings of the mobile body 5. The generator 222 is configured to select, out of a plurality of projection surfaces prepared beforehand, the projection surface used in generating the composite image in accordance with the combination pattern determined by the determiner 221.

In the image processing device 2 configured as described above, preferably, the plurality of combination patterns include a first pattern in which the object is present next to the mobile body 5 on both sides of it, a second pattern in which the object is present next to the mobile body 5 on one side of it, a third pattern in which the object is present next to the mobile body 5 on the other side of it, and a fourth pattern in which no object is present next to the mobile body 5 on both sides of it.

In the image processing device 2 configured as described above, preferably, the plurality of projection surfaces include a projection surface TS1 for the first pattern, a projection surface TS2 for the second pattern, a projection surface TS3 for the third pattern, and a projection surface TS4 for the fourth pattern.

In the image processing device 2 configured as described above, preferably, the plurality of projection surfaces include a projection surface TS1A for the first pattern and a shared projection surface TS4A selected when the combination pattern is one of the second, third, and fourth pattern. Preferably, the generator 222 is configured, when the shared projection surface TS4A is selected, to generate the composite image while changing the position of the mobile body 5 on the shared projection surface TS4A in accordance with the combination pattern.

In the image processing device 2 configured as described above, preferably, the projection surfaces TS1 to TS4 each include a flat segment 91 located at and near a position where the mobile body 5 appears and a curved segment 92 connecting to the flat segment 91 and increasingly high relative to the flat segment 91 the farther away from the mobile body 5. Preferably, the mobile body 5 and the curved segment 92 have different relationships among the plurality of projection surfaces TS1 to TS4.

In the image processing device 2 configured as described above, preferably, the mobile body 5 is an observing vehicle 5. Preferably, the generator 222 is configured to select the one projection surface out of the plurality of projection surfaces TS1 to TS4 on recognizing completion of parking of the vehicle 5.

In the image processing device 2 configured as described above, preferably, the determiner 221 is configured to start to collect information for determining the combination pattern while the vehicle 5 is moving before completion of parking of the vehicle 5.

In the image processing device 2 configured as described above, preferably, there is further provided a display processor configured to perform processing for displaying an image including the composite image. Preferably, the display processor is configured, before completion of parking of the vehicle 5, to perform processing for displaying an image different from the composite image using the projection surface corresponding to the combination pattern and, after completion of parking of the vehicle 5, to perform processing for displaying the composite image using the projection surface corresponding to the combination pattern.

An illustrative image processing method according to another aspect of the present invention is an image processing method employed by an image processing device 2 used on a mobile body 5, and includes: a determination step of determining one out of a plurality of combination patterns as to the presence or absence of an object in a plurality of predetermined regions around the mobile body 5; and a generation step of generating a composite image by projecting onto a virtual projection surface a plurality of shot images acquired by a plurality of cameras 11 to 14 taking images of surroundings of the mobile body 5, In the generation step, out of a plurality of projection surfaces prepared beforehand, the projection surface used in generating the composite image is selected in accordance with the combination pattern determined in the determination step.

6. Notes

The various technical features disclosed herein can be implemented in any manners other than as described in connection with an embodiment above with various modifications made within the spirit of their technical ingenuity. The different embodiments and modified example disclosed herein can be implemented in any possible combination.

The above description deals with a case where an object 6 can be present next to an observing vehicle 5 on its left and right sides (a case of side-by-side parking). However, the present invention is applicable also in a case where an object 6 can be present next to an observing vehicle 5 on its front and rear sides (head-to-tail parking).

The present invention is applicable not only to a parking completion scene but also to, for example, right and left turn scenes of the observing vehicle 5. In that case, for example, starting from when the observing vehicle 5 is approaching a crossroads, information on the distance to an object in a plurality of predetermined regions is acquired. Then, when the observing vehicle 5 enters the crossroads, the determiner 221 determines a combination pattern as to the presence or absence of an object in the plurality of predetermined regions around the observing vehicle 5, and the generator 222 selects a projection surface to be used in generating a composite image.

What is claimed is:

1. An image processing device used on a mobile body, the device comprising:
   at least one processor or integrated circuit configured to function as:
      a determiner configured to determine one out of a plurality of combination patterns among which to classify different circumstances as to presence or absence of an object in a plurality of predetermined regions around the mobile body; and
      a generator configured to generate a composite image by projecting onto a virtual projection surface a plurality of shot images acquired by a plurality of cameras taking images of surroundings of the mobile body,
   wherein
   the generator is further configured to out of a plurality of projection surfaces corresponding to respective ones of the plurality of combination patterns, the plurality of projection surfaces prepared before the composite image is generated, select the projection surface used in generating the composite image in accordance with the combination pattern determined by the determiner, and
   the plurality of combination patterns include
      a first pattern in which the object is a plurality of objects, the plurality of objects being present next to the mobile body on both sides thereof,
      a second pattern in which the object is present next to the mobile body on one side thereof,
      a third pattern in which the object is present next to the mobile body on another side thereof, and
      a fourth pattern in which no object is present next to the mobile body on both sides thereof.

2. The image processing device according to claim 1, wherein
   the plurality of projection surfaces include
      a projection surface for the first pattern,
      a projection surface for the second pattern,
      a projection surface for the third pattern, and
      a projection surface for the fourth pattern.

3. The image processing device according to claim 1, wherein
   the plurality of projection surfaces include
      a projection surface for the first pattern and
      a shared projection surface selected when the combination pattern is one of the second, third, and fourth pattern, and
   the generator is configured, when the shared projection surface is selected, to generate the composite image while changing a position of the mobile body on the shared projection surface in accordance with the combination pattern.

4. The image processing device according to claim 1, wherein
   the projection surface includes
      a flat segment located at and near a position where the mobile body appears and
      a curved segment connecting to the flat segment and increasingly high relative to the flat segment the farther away from the mobile body, and
   the mobile body and the curved segment have different relationships among the plurality of projection surfaces.

5. The image processing device according to claim 1, wherein
   the mobile body is a vehicle, and
   the generator is configured to select the one projection surface out of the plurality of projection surfaces on recognizing completion of parking of the vehicle.

6. The image processing device according to claim 5, wherein
   the determiner is configured to start to collect information for determining the combination pattern while the vehicle is moving before completion of parking of the vehicle.

7. The image processing device according to claim 5, further comprising:
   a display processor configured to perform processing for displaying an image including the composite image,
   wherein
   the display processor is configured,
      before completion of parking of the vehicle, to perform processing for displaying an image different from the composite image using the projection surface corresponding to the combination pattern and,
      after completion of parking of the vehicle, to perform processing for displaying the composite image using the projection surface corresponding to the combination pattern.

8. An image processing method employed by an image processing device used on a mobile body, the method comprising:
   a determination step of determining one out of a plurality of combination patterns among which to classify different circumstances as to presence or absence of an object in a plurality of predetermined regions around the mobile body; and
   a generation step of generating a composite image by projecting onto a virtual projection surface a plurality of shot images acquired by a plurality of cameras taking images of surroundings of the mobile body,
   wherein
   in the generation step, out of a plurality of projection surfaces corresponding to respective ones of the plurality of combination patterns, the plurality of projection surfaces prepared before the composite image is generated, the projection surface used in generating the composite image is selected in accordance with the combination pattern determined in the determination step, and
   the plurality of combination patterns include
      a first pattern in which the object is a plurality of objects, the plurality of objects being present next to the mobile body on both sides thereof,
      a second pattern in which the object is present next to the mobile body on one side thereof,
      a third pattern in which the object is present next to the mobile body on another side thereof, and
      a fourth pattern in which no object is present next to the mobile body on both sides thereof.

* * * * *